United States Patent [19]
Kress et al.

[11] Patent Number: 5,915,889
[45] Date of Patent: Jun. 29, 1999

[54] CUTTING TIP DEVELOPED AS A POLYGON WITH A CHIP BREAKER

[75] Inventors: Dieter Kress, Aalen; Friedrich Häberle, Lauchheim, both of Germany

[73] Assignee: Mapal Fabrik fur Prazisionswerkzeuge Dr. Kress KG, Germany

[21] Appl. No.: 08/890,699

[22] Filed: Jul. 11, 1997

[30] Foreign Application Priority Data

Jul. 11, 1996 [DE] Germany ............... 196 27 990

[51] Int. Cl.[6] .................................................. B23B 27/22
[52] U.S. Cl. ...................... 407/114; 407/115; 407/116
[58] Field of Search .................................. 407/114, 113, 407/115, 116, 120

[56] References Cited

U.S. PATENT DOCUMENTS

| 3,395,434 | 8/1968 | Wirfelt .................... 407/114 |
| 3,792,214 | 2/1974 | Voshall .................... 200/144 |
| 4,312,250 | 1/1982 | Yankoff .................. 407/114 X |
| 4,318,318 | 3/1982 | Schott . | |
| 4,859,122 | 8/1989 | Patterson et al. ........... 407/116 X |
| 4,963,061 | 10/1990 | Katbi et al. ................ 407/114 |
| 4,971,483 | 11/1990 | Kress et al. ................ 407/114 |
| 5,265,928 | 11/1993 | Boppana et al. ............ 407/114 |

FOREIGN PATENT DOCUMENTS

| 0361031 | 4/1990 | European Pat. Off. . |
| 374800 | 6/1990 | European Pat. Off. . |
| 2231631 | 2/1973 | Germany . |
| 3333100 | 9/1984 | Germany . |
| 3321982 | 10/1984 | Germany . |
| 4437542 | 4/1996 | Germany . |

*Primary Examiner*—Andrea L. Pitts
*Assistant Examiner*—Henry W. H. Tsai
*Attorney, Agent, or Firm*—Ostrolenk, Faber, Gerb & Soffen, LLP

[57] ABSTRACT

A polygon shaped cutting tip for a metal workpiece boring tool, the cutting tip having linear side edges lying in a common plane and adjacent side edges which pass tangentially into rounded corner regions. Parts of the corner regions and of the side edges serve as the primary and secondary cutting edges of the tip. A chip breaker edge is arranged at a distance in from the side edges. A chip breaker surface extends from the side edge to the chip breaker edge. The chip breaker edge includes linear sections corresponding to the linear side edges of the tip and has curved sections which correspond to the curved regions of the side edges. The arc of curvature of both the curved regions and the curved sections is the same although the arcuate length of the curved sections is greater. The chip breaker surface extends from the side edges of the corner regions inward toward and downward into the tip at an acute angle where it intersects the chip breaker edges.

22 Claims, 2 Drawing Sheets

1

CUTTING TIP DEVELOPED AS A POLYGON WITH A CHIP BREAKER

BACKGROUND OF THE INVENTION

The present invention relates to a cutting tip developed as a polygon for the machining of the surfaces of bore holes in metal workpieces, and more particularly to the chip breaker at the tip.

Cutting tips of the type here are used together with tools which carry out a relative rotation with respect to the bore hole to be machined. It is therefore possible to place the workpiece to be machined in rotation while the tool is stationary, or else to introduce the rotating tool into the bore hole in a stationary workpiece. Upon the machining of the surface of the bore hole, chips are removed by the cutting tip. In particular, upon the finish-machining of the surface of bore holes, the flow of the chips is of decisive importance. It is important that the chips are removed from the hole being machined without there being a clogging of the chips and the surface of the hole obtained being thereby impaired. Both excessively long spiral chips and chips which are too short lead in this connection to an impairment. Particularly in the case of cutting tips having round cutting edges, such as are concerned here, the obtaining of short chips is extremely problematical.

SUMMARY OF THE INVENTION

It is therefore the object of the invention to create a cutting tip of the aforementioned type which assures sufficiently short chips.

This object is achieved in the case of a polygon shaped cutting tip for a metal workpiece boring tool, the cutting tip having linear side edges lying in a common plane and adjacent side edges which pass tangentially into rounded corner regions. Parts of the corner regions and of the side edges serve as the primary and secondary cutting edges of the tip. A chip breaker edge is arranged at a distance in from the side edges. A chip breaker surface extends from the side edge to the chip breaker edge. The chip breaker edge includes linear sections corresponding to the linear side edges of the tip and includes curved sections which correspond to the curved regions of the side edges. The arc of curvature of both the curved regions and the curved sections is the same although the arcuate length of the curved sections is greater. The chip breaker surface extends from the side edges of the corner regions inward toward and downward into the tip at an acute angle where it intersects the chip breaker edges. Due to the fact that the cutting tip has chip breaker edges which, in the region of the rounded corner regions of the cutting tip, are curved in substantially the same direction as the corner regions, the chip-flow and chip-breaking behavior can be optimally influenced.

There is particularly preferred an embodiment of the cutting tip which is characterized by the fact that the length of the curved chip breaker-edge section is greater than the length of the rounded corner region, so that the chip breaker edge protrudes virtually in the direction of the rounded corner region so that the chip breaker surface is virtually shortened. By the projection, it is possible to obtain relatively short chips, so that impairment of the surface of the bore hole obtained is practically out of the question.

There is furthermore preferred an embodiment of the cutting tip in which the center of curvature of the curved chip breaker-edge section of the rounded corner region lies on an imaginary straight line which coincides with the angle bisector of the rounded corner region. In this way, it is particularly easy to vary the chip-flow and chip-breakage behavior and adapt it to materials of the workpieces to be machined.

Other features and advantages of the present invention will become apparent from the following description of the invention which refers to the accompanying drawings.

BRIEF DESCRIPTION OF THE DRAWING(S)

The invention is explained below with reference to the drawings, in which.

DETAILED DESCRIPTION OF EMBODIMENTS OF THE INVENTION

The cutting tip developed as a polygon which is described below serves for machining the surface of bore holes, particularly the finish-machining, in which an optimal flow of the chips is particularly important, since chips which are too long and might lead to an accumulation of chips harm the surface of the bore and chips which are too short may result in a metal dust within the machined hole, which also impairs the surface obtained.

The number of corners of the cutting tip is, in the final analysis, not decisive. Therefore, in addition to the hexagonal and square cutting tips described below, an octagonal cutting tip can also be produced for instance. Triangular cutting tips are also possible.

Figure 1:
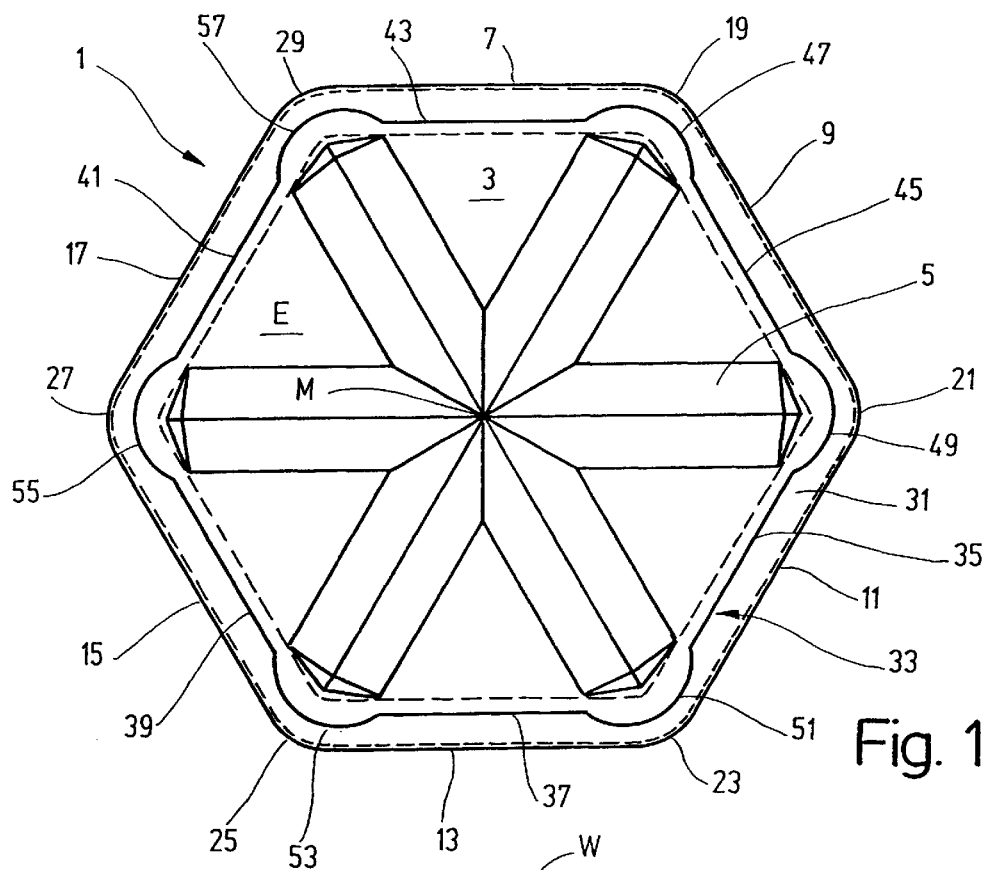
FIG. 1 is a top view of a first embodiment of a cutting tip.

FIG. 1 shows a first embodiment of a cutting tip 1 having six corners, as seen in top view. The figure shows the front side 3 of the cutting tip 1, which side is also referred to as the cutting face. In the front side, there can be provided holding slots 5 into which holding devices, for instance holding clamps engage and firmly anchor the cutting tip 1 on the body of a suitable tool. The holding slots are in this case developed radially, in each case in the direction towards the opposite corner of the hexagonal cutting tip.

The cutting tip 1 has six linear side edges 7, 9, 11, 13, 15 and 17, which pass tangentially into rounded corner regions 19, 21, 23, 25, 27 and 29. The corner regions are preferably curved in the shape of a circular arc. The side edges and corner regions all lie in a common plane E, which coincides with the plane in which the front side 3 of the cutting tip 1 also lies. Adjoining the side edges 7 to 17 and corner regions 19 to 29 on the inner side, and therefore seen in the direction towards the imaginary center M of the cutting tip 1, there is arranged a circumferential chip breaker surface 31. This breaker surface is limited towards the inside by a continuous chip breaker edge 33 which comprises linear sections 35, 37, 39, 41, 43 and 45, as well as curved sections 47, 49, 51, 53, 55 and 57.

From the top view in FIG. 1, it can be seen that the width of the chip breaker surface 31 or the distance between the outer limiting edges of the cutting tip 1 and the chip breaker edge 33 is greater in the region of the side edges and the linear sections of the chip breaker edge 33 than in the region of the curved corner regions and of the curved sections of the chip breaker edge 33. The curved sections of the chip breaker edge 33 protrude virtually in the direction of the rounded corner regions, in other words the linear sections of the chip breaker edge 33 do not pass tangentially into the curved sections of the chip breaker edge.

Figure 2:
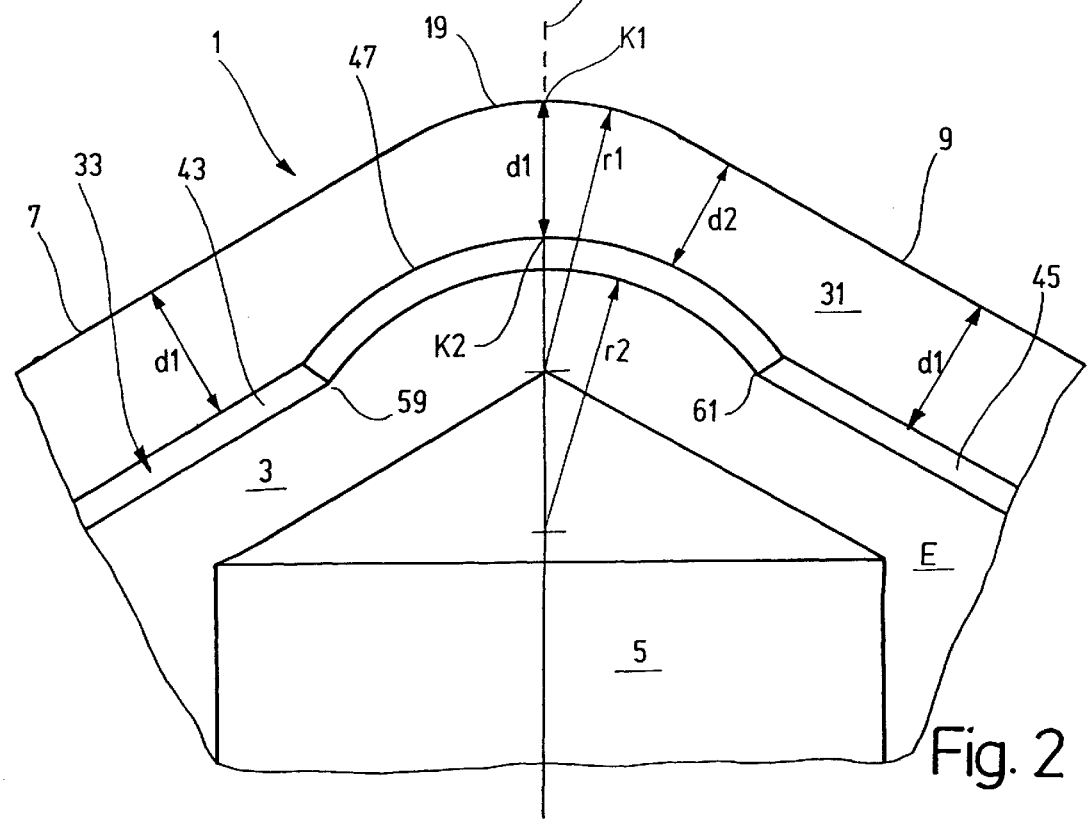
FIG. 2 is a greatly enlarged view of the corner region of the cutting tip of FIG. 1, seen in top view.

FIG. 2 shows, in a greatly enlarged view, a corner region of the cutting tip 1, for instance the rounded cutting region 19 which the linear side edges 7 and 9 adjoin tangentially.

The curved section 47 of the chip breaker edge 33 extends at a distance from the curved corner region 19. It is here, as can also be clearly noted from FIG. 1, that the two regions are curved in the same direction and arch outward from the center M of the cutting tip 1.

The chip breaker edge 33 extends from the front side 3 other than perpendicularly to the chip breaker surface 31. This is shown here in the manner that parallel lines here represent the chip breaker edge 33.

The embodiment shown here is characterized by the fact that the radius of curvature r1 of the rounded corner regions 19 is of the same size as the radius of curvature r2 of the curved section 47. In particular, the enlarged view in FIG. 2 shows that the length of the rounded corner region 19 is clearly less than the length of the curved section 47. It is also clear that, while the rounded corner region 19 passes tangentially into the adjoining linear side edges 7 and 9, nevertheless, upon the transition between the linear sections 43 and 45 of the chip breaker edge 33 to the curved section 47, in each case there is a shoulder 59 and 61, formed in the manner that the curved section 47 is arched outward with respect to the linear sections 43 and 45 towards the rounded corner region 19. In this way, there is obtained a different width in the chip breaker surface 31. Between the linear side edges 7 and 9 and the linear sections 43 and 45 extending parallel thereto, there is a distance d1 which decreases in the region between the linear side edges 7 and 9 and the curved section 47 to the distance d2. In the region of the centers of curvature K1 of the rounded corner region 19 and K2 of the curved section 47, which lie on an imaginary straight line which coincides with the angle bisector W of the rounded corner region 19, the distance between the corner region and the corresponding curved section 47 is again of the same size as in the region of the linear side edges and of the corresponding linear sections. Therefore, here again, it amounts to d1. In the embodiment shown here, the fact is decisive that the chip breaker edge 33 serving as chip breaker or the curved section 47 has the same radius of curvature r2 as is present in the associated rounded corner region 19. The chip breaker edge 33 therefore forms arched/curved chip breaker projections in the corner regions, in the region of which the width of the chip breaker surface 31 is not constant. It decreases from the center of curvature K2 up to the shoulders 59 and 61 of the curved section 47.

In the embodiment shown in FIGS. 1 and 2, the centers of curvature lie on the angle bisector W. However, it is also possible to arrange the centers of curvature staggered from the angle bisectors. If the center of curvature K2 is shifted for instance to the left in FIG. 2, then the chip produced upon the machining of the wall of the bore hole flows off in the direction of the advance of the tool. Upon a displacement towards the right, the chip moves away in the opposite direction. Therefore, not only the chip breaking behavior but also the chip disposal behavior can be controlled, by the course of the chip breaker edge.

The conditions explained on basis of the rounded corner region are identical at all corners of the cutting tip 1, so that the tip can be used as reversible tip.

It is also possible, to be sure, to provide differently shaped corner regions on a single reversible tip, so as to be able to use it possibly in connection with different materials. However, in all cases, the decisive factor is that the chip breaker edge 33 has, in its corner regions, projections which are formed by the curved sections 47 to 57, in the region of which the chip breaker surface 31 tapers down.

From FIGS. 1 and 2 it can be noted that the development of the cutting tip 1 is symmetrical with respect to the angle bisector W.

Figure 3:
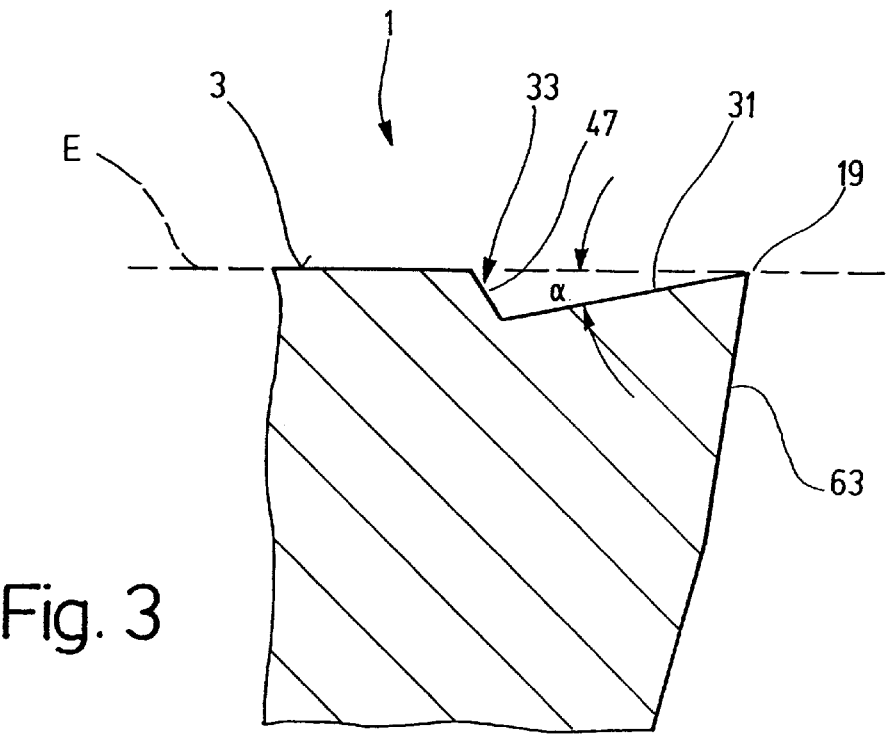
FIG. 3 is a section through a corner region of the cutting tip, such as shown in FIG. 2.

FIG. 3 shows a section through the corner region of the cutting tip 1. The section through the cutting tip 1 taken along the angle bisector W again clearly shows that the circumferential line of the cutting tip 1 formed by the side edges and corner regions, and thus also the primary and secondary cutting edges, lie in the common plane E in which the front side 3 of the cutting tip 1 is also arranged. From the cutting edges or from the rounded corner region 19 the chip breaker surface 31 extends down from the plane E in the direction towards the center M of the cutting tip 1 at an acute angle α which lies within the range of 9° to 18° and preferably 11° to 13°, and amounts in particular to about 12°. The chip breaker surface 31 is limited towards the inside by the obliquely descending chip breaker edge 33 or by the curved section 47. The chip breaker edge 33 forms in this case an obtuse angle with the chip breaker surface 31. It descends therefore from the plane E in the direction towards the chip breaker surface 31. From the side edges or corner regions of the cutting tip 1 which form the primary and secondary cutting edges of the cutting tip, the chips produced upon the machining of the surface of a bore hole come onto the chip breaker surface 31 and strike against the chip breaker edge 33. There the chips are deflected and broken up. By the curved section of the chip breaker edge 33 there is obtained a particularly favorable breakage behavior of the chips so that long spirals and short broken pieces can be avoided and an optimal quality of the surface of the machined bore holes obtained.

From FIG. 3 it is clear that the cutting edges of the cutting tip 1 or the side edges and the corner regions are formed by the section line of the chip breaker surface 31 with the surrounding flank 63. The flank 63 extends, as in known cutting tips, at an angle to the plane E which is somewhat less than 90° so that a so-called clearance angle results.

Figure 4:
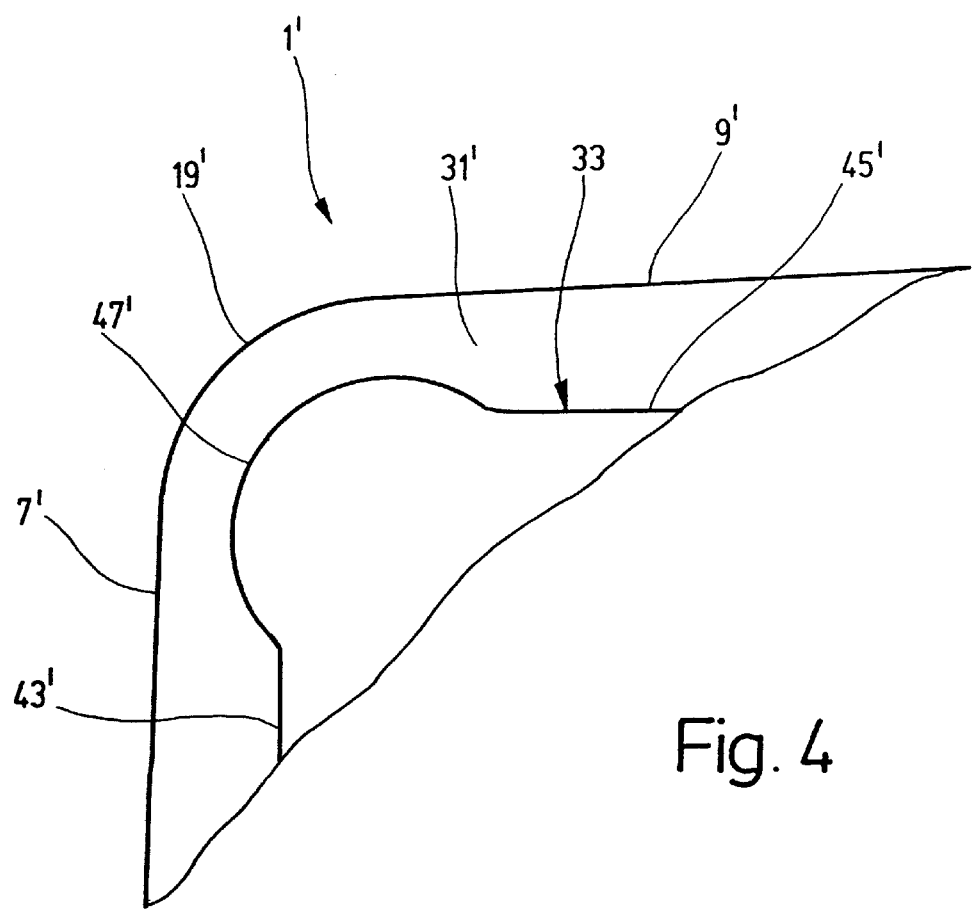
FIG. 4 shows the corner region of a second embodiment of a cutting tip.

FIG. 4 shows, in another embodiment of a cutting tip 1', a rounded corner region 19' which is formed by two side edges 7' and 9' which extend here at an angle of 90° to each other and pass tangentially into the corner region 19'. At a distance from the side edges and from the corner region, there extends, in this case also, a chip breaker edge 33 which comprises two linear sections 43' and 45' extending parallel to the side edges and has a curved section 47' between them. It is characteristic that, in this case also, in the same way as explained on basis of FIGS. 1 and 2, the curved section 47 formed so to speak a projection which protrudes beyond the rounded corner region 19' so that narrower regions of the chip breaker surface 31' are present there, as has been explained on the basis of FIG. 2.

In accordance with FIG. 4, the rounded corner region 19' and the curved section 47' are again curved in the same direction and preferably follow an arcuate line. There has been found to be particularly suitable a development in which the radius of curvature of the corner region and that of the curved section are the same. However, it is also possible, for instance in the case of an octagonal development of the cutting tip, to provide different radii of curvature. The decisive factor still is that the chip breaker edge form an arched projection in the region of the corner region of the cutting tip. By "arched" it is meant here that the curved section of the chip breaker edge extends in such a manner with respect to the corner region that chip breaker surface regions which are narrower at least in the region result. The same applies also to a development of a cutting tip which has merely three rounded corner regions.

The radii of curvature of the corner regions and of the corresponding curved sections are therefore adapted to each other. It is possible to select radii of curvature within the range of 0.2 mm to 0.6 mm, and preferably from 0.3 mm to 0.5 mm. Radii of curvature of 0.4 mm have, for instance, proven particularly suitable.

In another embodiment of the cutting tip, radii of curvature of preferably 0.6 mm to 1.2 mm and especially from 0.7 mm to 0.9 mm have proven suitable. There is particularly preferred an embodiment with radii of curvature of 0.6 mm and a distance d1 (see FIG. 2) of 0.5 mm. However, it is also possible to select the distance d1 within the range of 0.3 mm to 0.7 mm, and preferably from 0.4 mm to 0.6 mm.

By a variation of the radii of curvature of the corner regions and of the curved sections, the projection of the chip breaker edges 33 can be greater or less in the region of the rounded corner regions. By the chip breaker edge which is arched forward in this region, the chip-flow and chip-breakage behavior can be so influenced as to obtain an optimal flow of the chips. Thus, the surface of the bore holes obtained remains unimpaired.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cutting tip for machining the surface of a bore hole in a metal workpiece, comprising:

the tip having a tip end for leading into the bore hole, the tip end being defined by a periphery shaped generally as a polygon and including linear side edges lying in a common plane; rounded corner regions joining each of the side edges to the adjacent side edges, and the side edges pass tangentially into the rounded corner regions; both the side edges and the rounded corner regions having respective parts that serve as the primary and secondary cutting edges of the cutting tip;

a chip breaker surface extending inward from the corner regions and the side edges and also inclined downwardly into the tip to form an acute angle with the common plane;

the tip being shaped to define a chip breaker edge at an inward side of the chip breaker surface, the chip breaker edge having linear sections extending parallel to the linear side edges and having curved sections between each adjacent ones of the linear sections of the chip breaker edge, and the curved sections of the chip breaker edge being curved in the same direction as and in the region of the rounded corner regions of the cutting edges, the arcuate length of each curved section of the chip breaker edge is greater than the arcuate length of the corresponding rounded corner region at the same location around the tip.

2. The cutting tip of claim 1, wherein the acute angle of the chip breaker surface leading to the chip breaker edge lies in the range of 8° to 18°.

3. The cutting tip of claim 1, wherein the acute angle of the chip breaker surface leading to the chip breaker edge lies in the range of 11° to 13°.

4. The cutting tip of claim 1, wherein the acute angle of the chip breaker surface leading to the chip breaker edge is about 12°.

5. The cutting tip of claim 1, wherein the chip breaker edge intersects the chip breaker surface.

6. The cutting tip of claim 5, wherein the chip cutting edge intersects the common plane at an obtuse angle.

7. The cutting tip of claim 1, wherein the rounded corner regions of the cutting edges have the shape of a circular arc of a first radius of curvature and the curved sections of the breaker edge also have a shape of a circular arc of the first radius of curvature.

8. The cutting tip of claim 7, wherein the curved sections of the chip breaker edge are so shaped and the curved sections are of such length and the side edges and the linear sections of the chip breaker edge are so spaced that there is a constant distance between the side edges and the linear sections of the chip breaker edge, and that is the same distance as the distance between the center of the curved section of the chip breaker edge and the center of the respective curved region of the cutting edge.

9. The cutting tip of claim 8, wherein the distance between the curved section of the chip breaker edge and the respective curved region of the cutting edge is smaller than the space between the linear cutting edge and the linear section of the chip breaker edge along the entire curved section of the chip breaker edge at the center of the curved chip breaker edge and at the ends of the arc of the curved section of the chip breaker edge.

10. The cutting tip of claim 9, wherein the distance between the side edges and the respective linear sections of the chip breaker edges is in the range of 0.3 mm to 0.7 mm.

11. The cutting tip of claim 9, wherein the distance between the side edges and the respective linear sections of the chip breaker edges is in the range of 0.4 mm to 0.6 mm.

12. The cutting tip of claim 9, wherein the distance between the side edges and the respective linear sections of the chip breaker edges is about 0.5 mm.

13. The cutting tip of claim 9, wherein the center of curvature of each curved section of the chip breaker edge lies along a line coinciding with the center of curvature of the respective rounded corner region of the chip breaker edge.

14. The cutting tip of claim 7, wherein the center of curvature of each curved section of the chip breaker edge lies along a line coinciding with the center of curvature of the respective rounded corner region of the chip breaker edge.

15. The cutting tip of claim 7, wherein the radius of curvature of both the rounded corner regions of the cutting edge and of the curved sections of the chip breaker edge is in the range of 0.2 mm to 0.6 mm.

16. The cutting tip of claim 7, wherein the radius of curvature of both the rounded corner regions of the cutting edge and of the curved sections of the chip breaker edge is in the range of 0.3 mm to 0.5 mm.

17. The cutting tip of claim 7, wherein the radius of curvature of both the rounded corner regions of the cutting edge and of the curved sections of the chip breaker edge is about 0.4 mm.

18. The cutting tip of claim 7, wherein the radius of curvature of both the rounded corner regions of the cutting edge and of the curved sections of the chip breaker edge is in the range of 0.6 mm to 1.2 mm.

19. The cutting tip of claim 7, wherein the radius of curvature of both the rounded corner regions of the cutting edge and of the curved sections of the chip breaker edge is in the range of 0.7 mm to 0.9 mm.

20. The cutting tip of claim 7, wherein the radius of curvature of both the rounded corner regions of the cutting edge and of the curved sections of the chip breaker edge is about 0.8 mm.

21. The cutting tip of claim 7, wherein the cutting tip is of hexagonal development and has six side edges and six linear sections.

22. The cutting tip of claim 7, wherein the cutting tip is of square development and has four side edges and four linear sections.

* * * * *